United States Patent Office

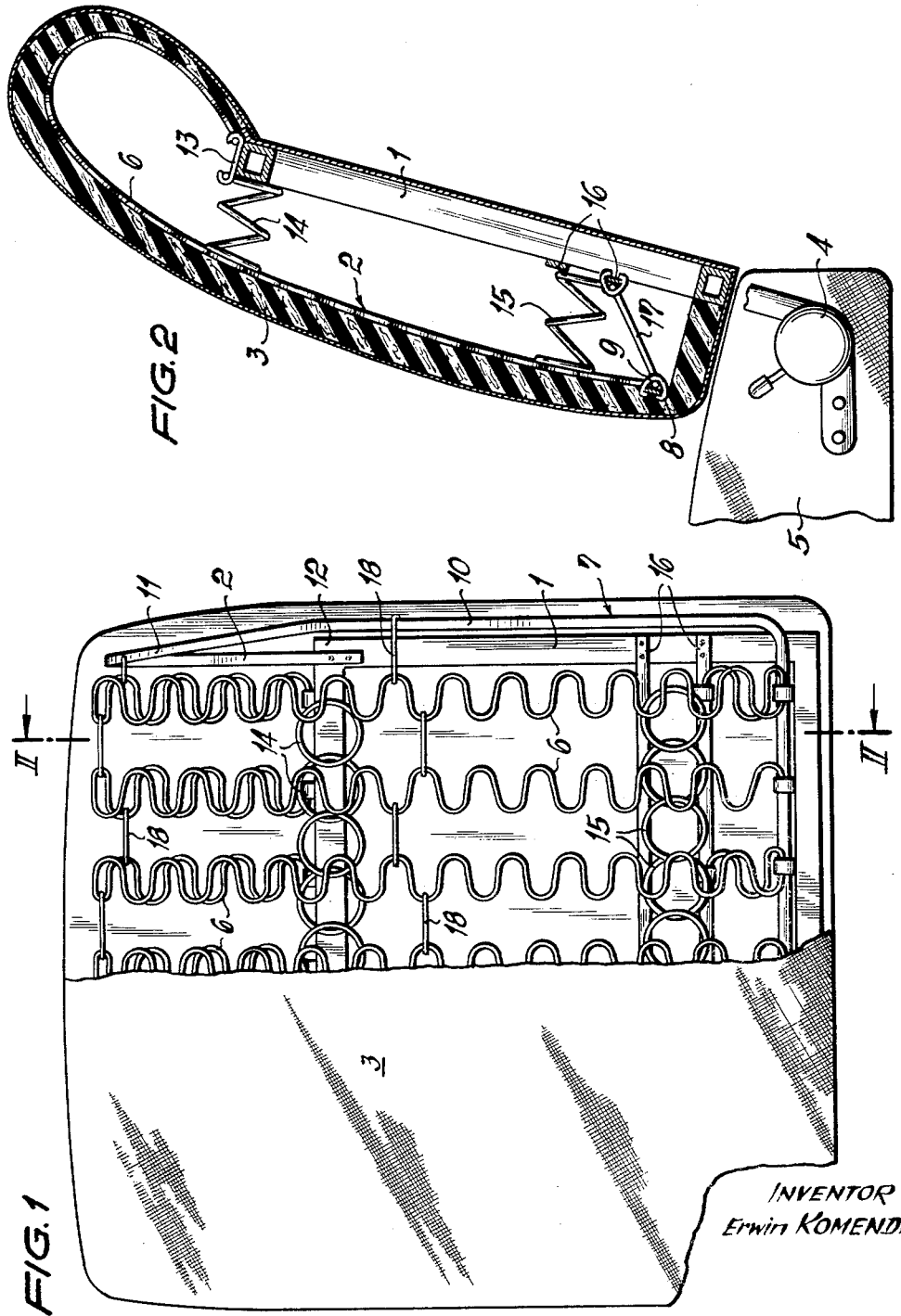

3,206,250
Patented Sept. 14, 1965

3,206,250
SEAT CONSTRUCTION
Erwin Komenda, Konstrukteur, Stuttgart, Germany, assignor to Firma Dr. Ing. h.c. F. Porsche K.G., Stuttgart-Zuffenhausen, Germany
Filed Nov. 2, 1964, Ser. No. 408,007
Claims priority, application Germany, Nov. 7, 1963,
P 32,938
11 Claims. (Cl. 297—456)

The present invention relates to a back rest for vehicles, especially motor vehicles having a back rest frame and a spring core secured thereat, whereby the upper edge of the spring core projects beyond the upper edge of the back rest frame.

It is known in the prior art to equip the spring core of a back rest with a closed frame and to partly support the same with respect to the back rest frame by means of springs. The upper edge of the frame is connected with the back rest frame, kept at a lower height, by a support clamp strap, or the like which simultaneously clamps the padding or upholstering of the back rest. This supporting clamp, the upper horizontal web of the frame of the spring core and the back rest frame have to be provided thereby in the prior art constructions with a protective padding in order to avoid accidents and injuries. Additionally, the yieldingness of the aforementioned parts is slight and exists exclusively within certain areas so that special measures and provisions are necessary in connection with the padding and upholstering.

These disadvantages are avoided by the present invention in that the spring core is constituted by essentially vertically extending elastic or springy bands which are extended up to the upper edge of the back rest frame in a loop-shaped manner and are secured thereat. As a result thereof, hard edges are avoided at the upper edge of the back rest so that a special protective padding is not necessary. The upper region of the back rest is also uniformly yielding in all directions and over the entire width of the back rest whereby the seating comfort is improved. The fastening of the springy bands takes place, on the one hand, at the upper edge of the back rest frame and, on the other, at a horizontally extending web of an essentially U-shaped edge-frame. The leg portions of the U-shaped edge-frame are secured at the upper edge of the back rest frame under formation of a loop. As a result thereof, the termination of the edge-frame corresponds to the form of the elastic bands so that there is produced over the entire width of the back rest a uniform and elastic upper back rest edge forming simultaneously an impact protection. The spring bands of the spring core are constituted by loop springs, known per se, which are rigidly connected with the back rest frame and the edge-frame. A simple, inexpensive and easily manufacturable spring core is produced by such an arrangement. The loop springs are connected with each other and with the leg portions of the edge-frame either elastically or rigidly, for example, by means of clamps, whereby the loop springs are additionally supported at the back rest frame by coil or cylindrical springs, possibly by a bracing or strutting of the frame.

Accordingly, it is an object of the present invention to provide a back rest for vehicles, especially motor vehicles which avoids the aforementioned shortcomings and drawbacks encountered with the prior art by extraordinarily simple means.

Another object of the present invention resides in the provision of a back rest construction for motor vehicles which obviates the need for special protective padding.

Still another object of the present invention resides in the provision of a back rest for motor vehicles offering considerable yieldingness over substantially the entire area thereof.

A still further object of the present invention resides in the provision of a back rest which improves the seating comfort of the driver or passenger of a motor vehicle by a greater uniformity in the yieldingness of the back rest.

Another object of the present invention resides in the provision of a back rest for motor vehicles which is not only simple in construction but may also be manufactured and assembled in a simple and cost-saving manner.

These and other objects, features and advantages of the present invention will become more obvious from the following description when taken in connection with the accompanying drawing which shows, for purposes of illustration only, one embodiment in accordance with the present invention, and wherein FIGURE 1 is an end elevational view, partly broken away, of a back rest for a motor vehicle in accordance with the present invention, and FIGURE 2 is a cross sectional view, taken along line II—II of FIGURE 1.

Referring now to the drawing wherein like reference numerals are used throughout the two views to designate like parts, the back rest illustrated in the two figures essentially consist of a back rest frame 1 and of a spring core generally designated by reference numeral 2. The spring core 2 is provided with a cushion 3, for example, made of rubber hair as well as of a suitable covering. The back rest 1 is pivotally secured by means of conventional hinge fittings 4 at a seat 5 or at the frame thereof. The spring core 2 of the back rest consists of a plurality of elastic bands, for example, made of spring band steel, or of loop springs 6 which extend in vertical longitudinal planes of the back rest. The loop springs 6 are secured, on the one hand, at an edge-frame generally designated by reference numeral 7 and, on the other, at the back rest frame 1. The edge-frame 7 is constructed of essentially U-shaped and extends at a distance from the back rest frame 1. The loop springs 6 are thereby retained at the horizontally extending web 8 of the edge-frame 7 by means of clamps 9 of any conventional construction. The leg portions 10 of the edge-frame 7 are extended to the upper part 12 of the back rest frame 1 under formation of a loop 11 and are secured thereat in any conventional manner.

The loop springs 6 are extended, in a similar manner, and more particularly in a loop-shaped manner to the upper edge of the back rest frame 1 and are rigidly connected therewith by means of conventional clamps 13 (FIG. 2).

The loop springs 6 are further supported at the back rest frame 1 by means of two rows of cylindrical springs 14 and 15. The cylindrical springs 14 thereby abut directly against the upper part 12 of the frame 1. The cylindrical springs 15 are supported against rods 16 secured at the frame 1. The web portion 8 of the edge-frame 7 is elastically connected additionally with the back rest frame 1 by several elastic bands 17 which may also be constituted by loop springs.

The loop springs 6 are connected with each other and with the leg portions 10 of the edge-frame 7 by clamps 18 of conventional construction. These clamps 18 are made preferably of wire. However, elastic rings, springs or the like may also be utilized.

By the construction of the back rest-spring core in accordance with the present invention, there is created a form-rigid upper back rest edge that is nevertheless far-reachingly elastic, which is provided with no rigid edges that may cause possible injury to the passengers.

While I have shown and described one embodiment in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are encompassed by the scope of the appended claims.

I claim:

1. A seat back rest for vehicles, especially motor vehicles, comprising:
back rest frame means,
spring core means fastened at said back rest frame means, the upper edge of said spring core means projecting above the upper edge of said back rest frame means,
said spring core means including substantially vertically extending springy band means extending to the upper edge of said back rest frame means in a loop-like manner,
and approximately U-shaped edge-frame means having a substantially horizontally extending web portion and leg portions,
said springy band means being secured, on the one hand, at the upper edge of the back rest frame means and, on the other, at said web portion.

2. A seat back rest for vehicles, espeically motor vehicles, comprising:
back rest frame means,
spring core means fastened at said back rest frame means, the upper edge of said spring core means projecting above the upper edge of said back rest frame means,
said spring core means including substantially vertically extending springy band means extending to the upper edge of said back rest frame means in a loop-like manner,
and approximately U-shaped edge-frame means having a substantially horizontally extending web portion and leg portions,
said springy band means being secured, on the one hand, at the upper edge of the back rest frame means and, on the other, at said web portion,
the leg portions of said U-shaped edge-frame means being secured at the upper edge of the back rest frame means under the formation of a loop.

3. A seat back rest for vehicles, especially motor vehicles, comprising:
back rest frame means,
spring core means fastened at said back rest frame means, the upper edge of said spring core means projecting above the upper edge of said back rest frame means,
said spring core means including substantially vertically extending springy band means extending to the upper edge of said back rest frame means in a loop-like manner,
said springy band means being constituted by loop spring means having only one end rigidly connected with the back rest frame means the other end being rigidly connected to the base of a substantially U-shaped edge-frame means.

4. A seat back rest for vehicles, especially motor vehicles, comprising:
back rest frame means,
spring core means fastened at said back rest frame means, the upper edge of said spring core means projecting above the upper edge of said back rest frame means,
said spring core means including substantially vertically extending springy band means extending to the upper edge of said back rest frame means in a loop-like manner,
said springy band means being constituted by loop spring means having only one end rigidly connected with the back rest frame means the other end being rigidly connected to the base of a substantially U-shaped edge-frame means,
and connecting means including clamp means for connecting the loop spring means with each other and with the leg portions of said edge-frame means.

5. A back rest according to claim 4, wherein said connecting means connects said loop spring means rigidly with each other and with said leg portions.

6. A back rest according to claim 4, wherein said connecting means connects said loop spring means elastically with each other and with said leg portions.

7. A seat back rest for vehicles, especeially motor vehicles, comprising:
back rest frame means,
spring core means fastened at said back rest frame means, the upper edge of said spring core means projecting above the upper edge of said back rest frame means,
said spring core means including substantially vertically extending springy band means extending to the upper edge of said back rest frame means in a loop-like manner,
said band means being constituted by loop springs having only one end rigidly connected with the back rest frame means the other end being rigidly connected to the base of a substantially U-shaped edge frame means,
and further connecting means including spring means for holding apart the loop spring means and said back rest frame means.

8. A seat back rest for vehicles, especially motor vehicles, comprising:
back rest frame means,
spring core means fastened at said back rest frame means, the upper edge of said spring core means projecting above the upper edge of said back rest frame means,
said spring core means including substantially vertically extending springy band means extending to the upper edge of said back rest frame means in a loop-like manner,
said band means being constituted by loop springs having only one end rigidly connected with the back rest frame means the other end being rigidly connected to the base of a substantially U-shaped edge frame means,
connecting means including clamp means for connecting the loop spring means with each other and with the leg portions of said edge frame means,
and further connecting means including spring means disposed substantially perpendicular to the plane of the back rest frame means for holding apart the loop spring means and said back rest frame means.

9. A seat back rest for vehicles, especially motor vehicles, comprising:
back rest frame means provided with strut means,
spring core means fastened at said back rest frame means, the upper edge of said spring core means projecting above the upper edge of said back rest frame means,
said spring core means including substantially vertically extending springy band means extending to the upper edge of said back rest frame means in a loop-like manner,
said band means being constituted by loop spring having only one end rigidly connected with the back rest frame means the other end being rigidly connected to the base of a substantially U-shaped edge frame means,
connecting means including clamp means for connecting the loop spring means with each other and with the leg portions of said edge frame means,
and further connecting means including spring means disposed substantially perpendicular to the plane of the back rest frame means for holding apart the loop spring means and strut means of said back rest frame means.

10. A seat back rest for vehicles, especially motor vehicles, comprising:
back rest frame means,
spring core means fastened at said back rest frame means, the upper edge of said spring core means projecting above the upper edge of said back rest frame means,
said spring core means including substantially vertically extending springy band means extending to the upper edge of said back rest frame means in a loop-like manner,
approximately U-shaped edge-frame means having a substantially horizontally extending web portion and leg portions,
means for securing said springy band means, on the one hand, at the upper edge of the back rest frame means and, on the other, at said web portion,
means for fastening the leg portions of said U-shaped edge-frame means under formation of a loop at the upper edge of the back rest frame means,
said band means being constituted by loop spring means connected with the back rest frame means and the edge-frame means,
further connecting means including clamp means for connecting the loop spring means with each other and with the leg portions of said edge frame means,
said back rest frame means including bracing means,
and still further connecting means including spring means for holding apart the loop spring means and the bracing means of said back rest frame means.

11. A seat back rest for vehicles, especially motor vehicles, comprising:
back rest frame means,
spring core means fastened at said back rest frame means, the upper edge of said spring core means projecting above the upper edge of said back rest frame means,
said spring core means including substantially vertically extending springy band means extending to the upper edge of said back rest frame means in a loop-like manner,
and approximately U-shaped edge-frame means having a substantially horizontally extending web portion and leg portions,
said springy band means being secured, on the one hand, at the upper edge of the back rest frame means and, on the other, at said web portion,
the leg portions of said U-shaped edge-frame means being secured at the upper edge of the back rest frame means under the formation of a loop,
said springy band means being constituted by loop spring means rigidly connected with the back rest frame means and the edge-frame means.

References Cited by the Examiner

UNITED STATES PATENTS

| | | | |
|---|---|---|---|
| 2,253,914 | 8/41 | Probst | 267—109 |
| 2,535,463 | 12/50 | Stubnitz | 297—455 |
| 2,614,615 | 10/52 | Asaro | 297—455 |
| 2,698,651 | 1/55 | Flint | 267—109 |
| 2,709,483 | 5/55 | Weinberger | 297—455 |
| 2,745,472 | 5/56 | Flint | 267—109 |
| 2,834,403 | 5/58 | Pitts et al. | 267—109 |
| 3,081,131 | 3/63 | Brueder | 297—455 |

FOREIGN PATENTS 540,984   7/22   France.

FRANK B. SHERRY, *Primary Examiner.*